(12) United States Patent
Choi et al.

(10) Patent No.: US 10,303,314 B2
(45) Date of Patent: May 28, 2019

(54) TOUCH SENSOR

(71) Applicant: DONGWOO FINE-CHEM CO., LTD., Iksan-si, Jeollabuk-do (KR)

(72) Inventors: Byung Jin Choi, Siheung-si (KR); Jae Hyun Lee, Uiwang-si (KR)

(73) Assignee: DONGWOO FINE-CHEM CO., LTD., Iksan-Si (KR)

( * ) Notice: Subject to any disclaimer, the term of this patent is extended or adjusted under 35 U.S.C. 154(b) by 0 days.

(21) Appl. No.: 15/475,733

(22) Filed: Mar. 31, 2017

(65) Prior Publication Data

US 2017/0285801 A1 Oct. 5, 2017

(30) Foreign Application Priority Data

Mar. 31, 2016 (KR) .................. 10-2016-0039744

(51) Int. Cl.
*G06F 3/044* (2006.01)

(52) U.S. Cl.
CPC .... *G06F 3/044* (2013.01); *G06F 2203/04111* (2013.01)

(58) Field of Classification Search
CPC .................. G06F 3/044; G06F 2203/04111
See application file for complete search history.

(56) References Cited

U.S. PATENT DOCUMENTS

| 8,698,767 | B2 * | 4/2014 | Kwak | .................. | G06F 3/044 |
| | | | | | 178/18.05 |
| 9,933,886 | B2 * | 4/2018 | Kim | .................. | G06F 3/044 |

| 2011/0134055 | A1 * | 6/2011 | Jung | ................. | G06F 3/044 |
| | | | | | 345/173 |
| 2011/0187673 | A1 * | 8/2011 | Yin | ................. | G06F 3/044 |
| | | | | | 345/174 |
| 2013/0127769 | A1 * | 5/2013 | Guard | ................. | G06F 3/044 |
| | | | | | 345/174 |
| 2014/0035833 | A1 * | 2/2014 | Gorsica | ................. | G06F 3/041 |
| | | | | | 345/173 |
| 2014/0160372 | A1 * | 6/2014 | Li | ................. | G06F 3/044 |
| | | | | | 349/12 |

(Continued)

FOREIGN PATENT DOCUMENTS

KR     10-2013-0116583     10/2013

OTHER PUBLICATIONS

English language translation of KR 10-2013-0116583 published Oct. 24, 2013.

*Primary Examiner* — Jose R Soto Lopez
(74) *Attorney, Agent, or Firm* — DLA Piper LLP (US)

(57) ABSTRACT

The present invention relates to a touch sensor comprising: a plurality of first sensing electrode patterns formed in a way that they are connected to each other along a first direction on a substrate; a plurality of second sensing electrode patterns formed in a way that they are separated from each other along a second direction on the substrate; insulating portions electrically insulating the first sensing electrode patterns and the second sensing electrode patterns; and bridge pattern portions electrically connecting the adjacent second sensing electrode patterns, wherein the bridge pattern portions comprise: contact portions which are respectively contacted to the adjacent second sensing electrode patterns, and connecting portions connecting the contact portions and having a narrower width than the contact portions.

11 Claims, 6 Drawing Sheets

(56) References Cited

U.S. PATENT DOCUMENTS

| | | | | |
|---|---|---|---|---|
| 2014/0204283 | A1* | 7/2014 | Huh | G06F 3/044 |
| | | | | 349/12 |
| 2015/0277627 | A1* | 10/2015 | Pang | G06F 3/044 |
| | | | | 345/174 |
| 2015/0362949 | A1* | 12/2015 | Chen | G02F 1/13338 |
| | | | | 345/173 |
| 2016/0081189 | A1* | 3/2016 | Shimoda | H05K 1/097 |
| | | | | 428/209 |
| 2016/0124545 | A1* | 5/2016 | Xie | H05K 3/4685 |
| | | | | 345/174 |
| 2016/0224154 | A1* | 8/2016 | Kang | G06F 3/044 |
| 2016/0259447 | A1* | 9/2016 | Lin | G06F 3/044 |
| 2017/0228067 | A1* | 8/2017 | Kim | G06F 3/044 |
| 2017/0277292 | A1* | 9/2017 | Park | G06F 3/044 |

\* cited by examiner

TOUCH SENSOR

CROSS-REFERENCE TO RELATED APPLICATIONS

This application claims priority under 35 U.S.C. § 119 of Korean Patent Application No. 10-2016-0039744, filed on Mar. 31, 2016, in the Korean Patent Office, the entire contents of which are incorporated herein by reference in its entirety.

FIELD OF INVENTION

The present invention relates to a touch sensor. More particularly, the present invention relates to a technology capable of preventing a phenomenon wherein bridge patterns constituting a touch sensor is unnecessarily recognized by the user, and preventing the problem of disconnection in the bridge patterns under the high voltage environment, and by stably connecting the bridge patterns and sensing electrode patterns, the channel resistance and the signal delay time caused thereby are reduced, and thereby enhancing the operating speed of the touch sensor and the electrical characteristics of the touch sensor.

BACKGROUND

Generally, touch sensor is a device detecting the location of a touch in response to a touch when a user touches an image being displayed on a screen with a finger, a touch pen, or the like; and it is manufactured in a structure being mounted on a display device such as a liquid crystal display (LCD), an organic light-emitting diode (OLED), and the like.

According to the prior art, bridge patterns for electrically connecting the adjacent sensing electrode patterns are provided in a touch sensor, and when a touch sensor provided with these bridge patterns is mounted on a display, the bridge patterns are unnecessarily recognized by the user, so there is a problem in that the image quality of the display device wherein the touch sensor is mounted is degraded.

In addition, according to the prior art, the connection between the sensing electrode pattern and the bridge patterns is unstable, and due to this, there is a problem in that the channel resistance and the signal delay time are increased, thereby reducing the operating speed of the touch sensor.

Also, according to the prior art, there is a problem in that the performance characteristics of the touch sensor is thermally degraded due to the disconnection of the bridge patterns of the touch sensor under the high voltage environment.

PRIOR-ART DOCUMENTS

Patent Documents

Korea Patent Publication No. 2013-0116583 (Publication Date: Oct. 24, 2013, Title: Touch panel and manufacturing method thereof)

SUMMARY OF THE INVENTION

A technical objective of the present invention is to prevent the degradation in the image quality of a display device wherein a touch sensor is mounted due to the unnecessary recognition of the bridge patterns constituting the touch sensor for a user.

Another technical objective of the present invention is to reduce the channel resistance and the signal delay time caused thereby, and to enhance the operating speed of the touch sensor.

Yet another technical objective of the present invention is to prevent the problem of disconnection in the bridge patterns of the touch sensor under the high voltage environment and stably connect the bridge patterns and the sensing electrode patterns.

A touch sensor according to the present invention comprises: a plurality of first sensing electrode patterns formed in a way that they are connected to each other along a first direction on a substrate; a plurality of second sensing electrode patterns formed in a way that they are separated from each other along a second direction on the substrate; insulating portions electrically insulating the first sensing electrode patterns and the second sensing electrode patterns; and bridge pattern portions electrically connecting the adjacent second sensing electrode patterns, wherein the bridge pattern portions comprise: contact portions which are respectively contacted to the adjacent second sensing electrode patterns, and connecting portions connecting the contact portions and having a narrower width than the contact portions.

In the touch sensor according to the present invention, it is characterized in that the bridge pattern portions have an asymmetric structure.

In the touch sensor according to the present invention, it is characterized in that the contact portions constituting the bridge pattern portion are electrically connected to the second sensing electrode patterns via a plurality of contact areas as the intermediates.

In the touch sensor according to the present invention, it is characterized in that the plurality of the contact areas are the contact holes formed in the insulating portion.

In the touch sensor according to the present invention, it is characterized in that the plurality of contact areas is formed in a way that the contact areas are crossed to each other with respect to the center line in the lengthwise direction of the bridge pattern portions.

In the touch sensor according to the present invention, it is characterized in that the bridge pattern portions are formed by a material containing at least one from the group comprising silver (Ag), silver (Ag) alloy, and APC.

In the touch sensor according to the present invention, it is characterized in that the bridge pattern portions are formed in the shape of a winding curve.

In the touch sensor according to the present invention, it is characterized in that the contact portions and the connecting portions are formed in the shape of a winding curve while having a plurality of different radiuses of curvature or a same radius of curvature, and the minimum width of the contact portions is wider than the maximum width of the connecting portion.

In the touch sensor according to the present invention, it is characterized in that the contact portions are electrically connected to the second sensing electrode patterns through the contact areas, as the intermediates, extending towards the both directions with respect to the lengthwise direction of the bridge pattern portions.

In the touch sensor according to the present invention, it is characterized in that the contact portions include the protruded portions protruding towards the both directions with respect to the lengthwise direction of the bridge pattern portions.

In the touch sensor according to the present invention, it is characterized in that the protruded portions included in the contact portions are electrically connected to the second sensing electrode patterns through the contact areas, as the intermediates, extending towards the both directions with respect to the lengthwise direction of the bridge pattern portions.

In the touch sensor according to the present invention, it is characterized in that the contact portions include first protruded portions protruding towards one side with respect to the lengthwise direction of the bridge pattern portions, and second protruded portions protruding towards the other side with respect to the lengthwise direction of the bridge pattern portions.

In the touch sensor according to the present invention, it is characterized in that the first protruded portions are electrically connected to the second sensing electrode patterns, as the intermediates, extending towards the one side with respect to the lengthwise direction of the bridge pattern portions, and the second protruded portions are electrically connected to the second sensing electrode patterns, as the intermediates, extending towards the other side with respect to the lengthwise direction of the bridge pattern portions.

According to the present invention, there is an advantageous effect in that the problem of degradation in the image quality of the display device wherein the touch sensor is mounted due to the unnecessary recognition of the bridge pattern constituting the touch sensor by a user can be prevented.

In addition, there is an advantageous effect in that the operating speed of the touch sensor can be enhanced by reducing the channel resistance and the signal delay time.

Also, there is an advantageous effect in that the problem of disconnection in the bridge pattern of the touch sensor under the high voltage environment can be prevented, and the bridge pattern and the sensing electrode patterns can be stably connected.

DETAILED DESCRIPTION

Figure 1:
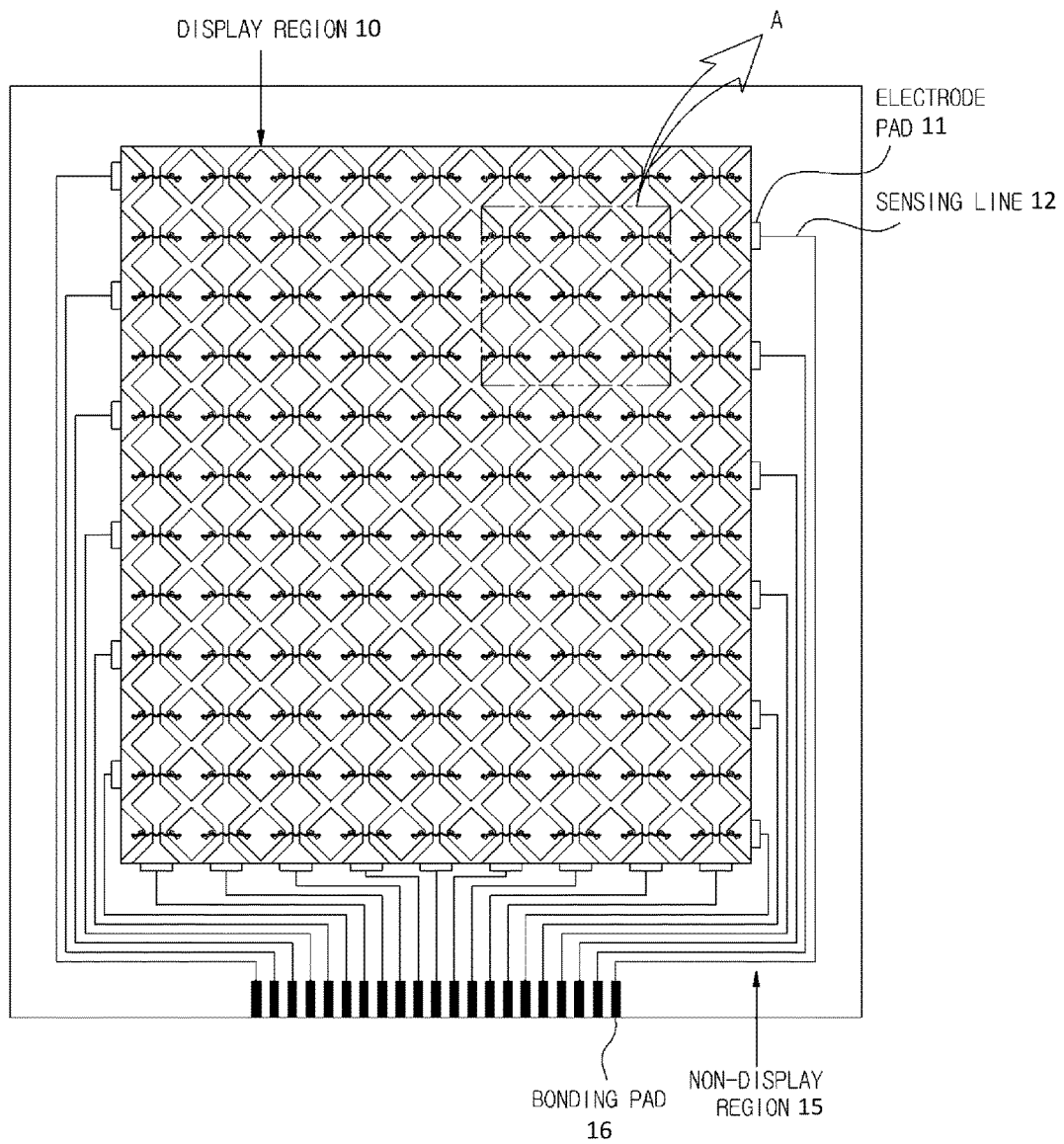
FIG. 1 is a schematic diagram illustrating the overall plan view of a touch sensor according to the present invention.

As specific structural or functional descriptions for the embodiments according to the concept of the invention disclosed herein are merely exemplified for purposes of describing the embodiments according to the concept of the invention, the embodiments according to the concept of the invention may be embodied in various forms but are not limited to the embodiments described herein.

While the embodiments of the present invention are susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic diagram illustrating the overall plan view of a touch sensor according to the present invention.

Referring to FIG. 1, a touch sensor according to the present invention can be classified into a display region 10 and a non-display region 15 with reference to whether the visual information is being displayed or not. In FIG. 1, it should be clarified that the non-display region 15 is more enlarged than the actual size thereof for the purpose of enhancing the visibility of the elements provided in the non-display region 15.

Display region 10 is a region wherein images provided by the device coupled with the touch sensor are displayed and at the same time it is a region for detecting touch signal input from the user using a capacitance method, and in this display region 10, elements including a plurality of sensing patterns formed in the mutually crossed direction is formed.

In the non-display region 15 located in the periphery of the display region 10, electrode pads 11 electrically connected to the sensing patterns, sensing lines 12 electrically connected to the electrode pads 11, and bonding pads 16 electrically connected to the sensing lines 12 are formed. A flexible printed circuit which transmits the touch signal detected in the display region 10 to a driving unit (not shown) is connected to the bonding pads 16.

Figure 2:
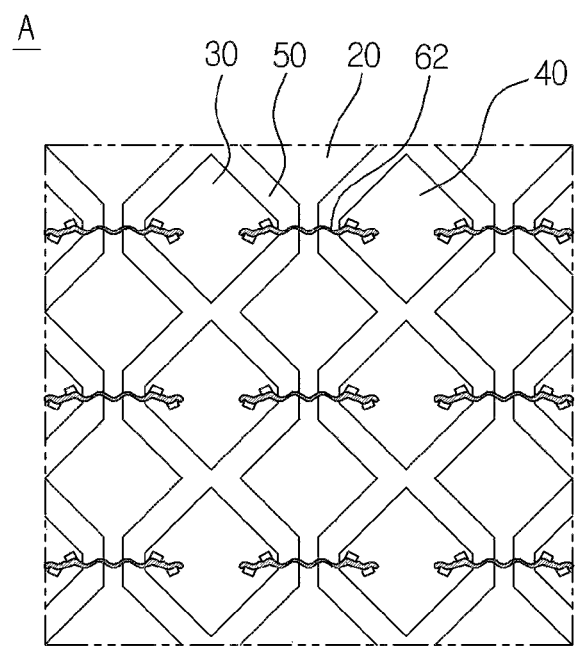
FIG. 2 is an enlarged view of region A as marked in FIG. 1.

FIG. 2 is an enlarged view of region A as marked in FIG. 1.

Additionally referring to FIG. 2, a touch sensor according to the present invention comprises: a substrate 10; a plurality of first sensing electrode patterns 20; a plurality of second sensing electrode patterns 30 and 40; a plurality of insulating portions 50; and a plurality of bridge pattern portions 62.

The first sensing electrode patterns 20 are electrically connected to each other and formed along a first direction, and the second sensing electrode patterns 30 and 40 are electrically isolated from each other and formed along a second direction, wherein the first direction and the second direction are crossing each other. For example, if the first direction is an x-direction, the second direction may be a y-direction. The insulating portions 50 are formed between the first sensing electrode patterns 20 and the second sensing electrode patterns 30 and 40, and electrically insulate the first sensing electrode patterns 20 from the second sensing electrode patterns 30 and 40. The bridge pattern portions 62 electrically connect the adjacent second sensing electrode patterns 30 and 40.

By additionally referring to the cross-sectional views, the structure of such touch sensor will be described as follows.

Figure 3:
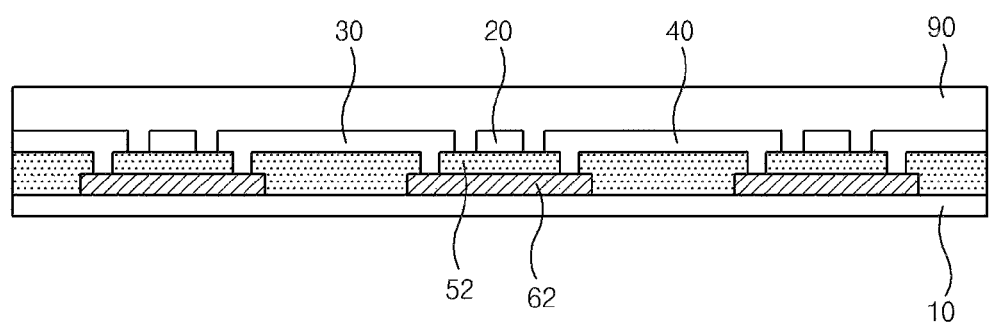
FIG. 3 illustrates one exemplary cross-sectional view of a touch sensor according to the present invention.
Figure 4:
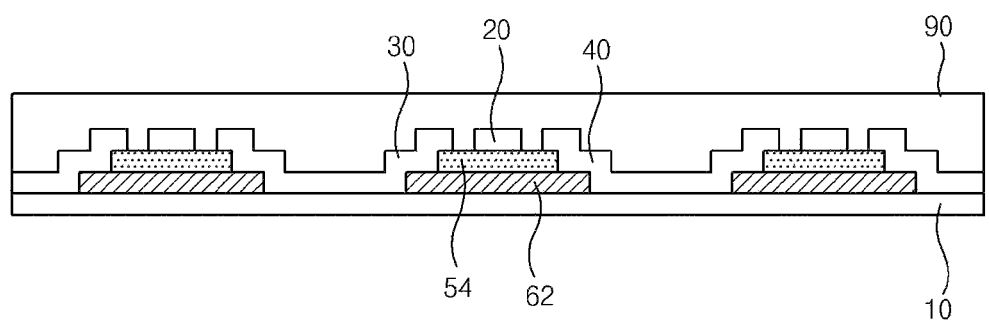
FIG. 4 illustrates another exemplary cross-sectional view of a touch sensor according to the present invention.

FIGS. 3 and 4 illustrate the exemplary cross-sectional views of the touch sensor according to the present invention.

The numerical symbol 10 in FIGS. 3 and 4 is a substrate and plays the role of a base wherein the elements constituting the touch sensor are formed, and may be a transparent material made of a hard or a soft material.

Additionally referring to FIGS. 3 and 4, the insulating portions of the touch sensor of the present invention can be classified into two types on the basis of the structure thereof.

For an example, as illustrated in FIG. 3, the insulating portions 52 can be formed over the entire surface of the substrate 10 including the bridge pattern portions 62. In this case, contact holes, exposing a portion of the surface of the bridge pattern portions 62, are formed in the insulating portions 52, and the adjacent second sensing electrode patterns 30 and 40 are filled in these contact holes, and at the same time, formed on the surface of the insulating portions 52, thereby electrically connecting the adjacent second sensing electrode patterns 30 and 40 by the bridge pattern portions 62.

For another example, as illustrated in FIG. 4, the insulating portions 54 are not formed over the entire surface of the substrate 10, but instead, can be configured in a way that they are formed on partial areas of the bridge pattern portions 62 corresponding to the areas where the first sensing electrode patterns 20 and the second sensing electrode patterns 30 and 40 are crossed, so that they are formed in the shape of islands. In this case, the contact holes are not required to be provided in the insulating portions 54, and the adjacent second sensing electrode pattern 30 and 40 are formed on the peripheral areas of the insulating pattern portions 54, and the peripheral areas of the bridge pattern portions 62, and on the substrate 10 between the bridge pattern portions 62, thereby electrically connecting the adjacent second sensing electrode patterns 30 and 40 by the bridge pattern portions 62.

The numerical symbol 90 in FIGS. 3 and 4 is an insulating layer and plays the role of protecting the elements constituting the touch sensor from the external factors.

Hereinafter, the exemplary embodiments of the present invention will be described by additionally referring to the FIGS. 5 and 6.

Figure 5:
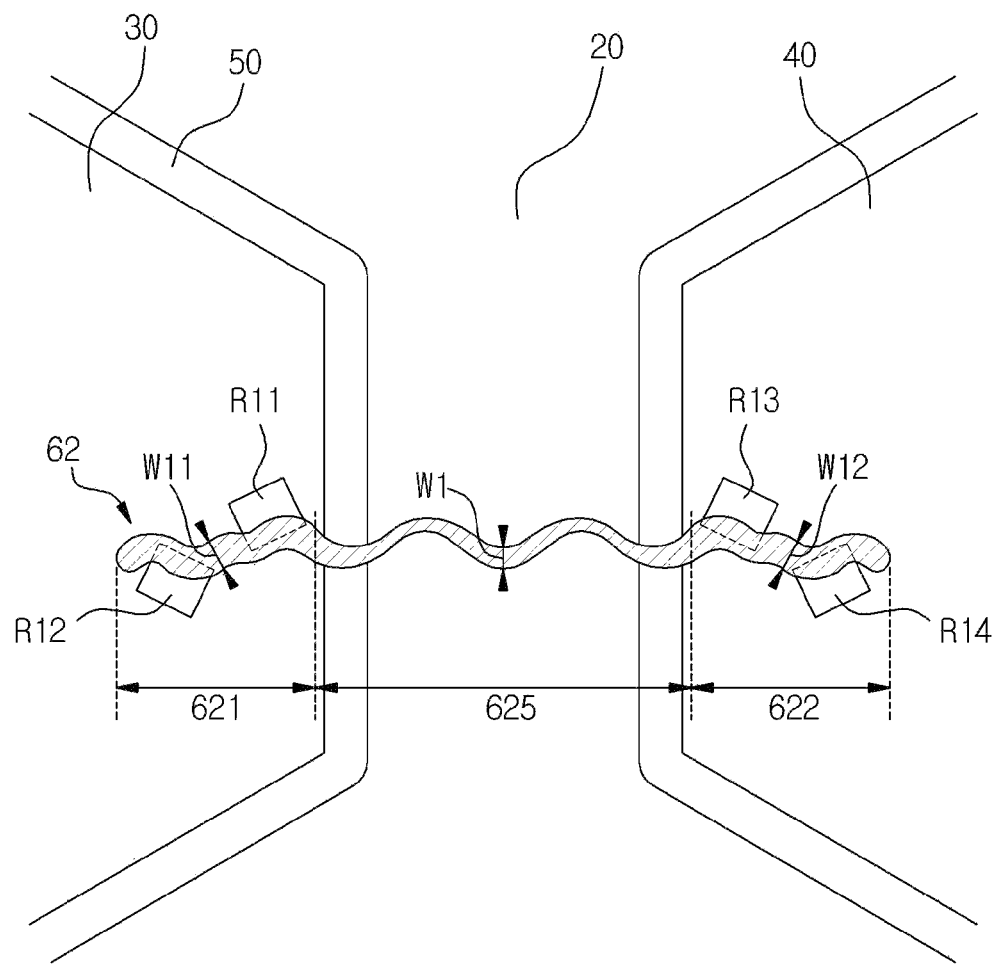
FIG. 5 is a view illustrating a touch sensor according to the first exemplary embodiment of the present invention.

FIG. 5 is a view illustrating a touch sensor according to the first exemplary embodiment of the present invention.

By additionally referring to FIG. 5, a touch sensor according to the first exemplary embodiment of the present invention comprises: a plurality of first sensing electrode patterns 20; a plurality of second sensing electrode patterns 30 and 40; a plurality of insulating portions 50; and a plurality of bridge pattern portions 62.

The plurality of first sensing electrode patterns 20 are formed on the substrate so as to be connected to each other along a first direction.

The plurality of second sensing electrode patterns 30 and 40 are formed on the substrate along a second direction, which is crossing with the first direction, in a way that they are isolated from each other. For example, if the first direction is an x-direction, the second direction may be a y-direction, however, the directions of forming the first sensing electrode patterns 20 and the second sensing electrode patterns 30 and 40 are not limited to this, but could be any direction satisfying the requirement that the both patterns are to be crossed over.

As for the materials of the first sensing electrode patterns 20 and the second sensing electrode patterns 30 and 40, any transparent conductive material can be used without limitation, for example, they can be formed with materials selected from: metal oxides selected from the group comprising indium tin oxide (ITO), indium zinc oxide (IZO), indium zinc tin oxide (IZTO), aluminum zinc oxide (AZO), gallium zinc oxide (GZO), fluorine tin oxide (FTO), indium tin oxide-Ag-indium tin oxide (ITO-Ag-ITO), indium zinc oxide-Ag-indium zinc oxide (IZO-Ag-IZO), indium zinc tin oxide-Ag-indium zinc tin oxide (IZTO-Ag-IZTO), and aluminum zinc oxide-Ag-aluminum zinc oxide (AZO-Ag-AZO); metals selected from the group comprising gold (Au), silver (Ag), molybdenum (Mo), and APC; nano wires made of metal selected from the group comprising gold, silver, copper, and lead; carbon based materials selected from the group comprising carbon nano tube (CNT) and grapheme; and conductive polymer materials selected from the group comprising poly(3,4-ethylenedioxitiophene) (PEDOT) and polyaniline (PANI), and these can be used individually or in a mixture of more than two of them, and preferably, indium tin oxide may be used. Both a crystalline and a non-crystalline indium tin oxide are usable.

The insulating portions 50 electrically insulate the first sensing electrode patterns 20 and the second sensing electrode patterns 30 and 40.

For an example, as illustrated in FIG. 3, the insulating portions 52 can be formed over the entire surface of the substrate 10 including the bridge pattern portions 62. In this case, contact holes, exposing a portion of the surface of the bridge pattern portions 62, are formed in the insulating portions 52, and the adjacent second sensing electrode patterns 30 and 40 are filled in these contact holes, and at the same time, formed on the surface of the insulating portions 52, thereby electrically connecting the adjacent second sensing electrode patterns 30 and 40 by the bridge pattern portions 62.

For another example, as illustrated in FIG. 4, the insulating portions 54 are not formed over the entire surface of the substrate 10, but instead, can be configured in a way that they are formed on partial areas of the bridge pattern portions 62 corresponding to the areas where the first sensing electrode patterns 20 and the second sensing electrode patterns 30 and 40 are crossed, so that they are formed in the shape of islands. In this case, the contact holes are not required to be provided in the insulating portions 54, and the adjacent second sensing electrode pattern 30 and 40 are formed on the peripheral areas of the insulating pattern portions 54, and the peripheral areas of the bridge pattern portions 62, and on the substrate 10 between the bridge pattern portions 62, thereby electrically connecting the adjacent second sensing electrode patterns 30 and 40 by the bridge pattern portions 62.

As for a material of the insulating portions 50, any insulating material known to the art may be used without limitation, for example, metal oxides like silicon based oxides, photosensitive resin composites containing metal oxides or acrylic resins, or thermoplastic resin composites may be used. Or, the insulating portions 50 may be formed using inorganic materials such as silicon oxides (SiOx), and in this case, they can be formed using methods such as vacuum evaporation, sputtering, and the like.

The bridge pattern portions 62 perform the role of electrically connecting the adjacent second sensing electrode patters 30 and 40.

Such bridge pattern portions 60 comprise: contact portions 621 and 622; and connecting portions 625.

The contact portions 621 and 622 constituting the bridge pattern portions 62 are the elements which are respectively contacted to the adjacent second sensing electrode patterns 30 and 40, and electrically connected to the second sensing electrode patterns 30 and 40 thereby. More specifically, the first contact portions 621 are contacted to the second sensing electrode patterns 30 located at the left side of the drawing, and the second contact portions 622 are contacted to the second sensing electrode patterns 40 located at the right side of the drawing, and the connecting portions 625 connect the first contact portions 621 and the second contact portions 622.

The connecting portions 625 are the elements connecting the contact portions 621 and 622, and configured to have narrower widths than the contact portions 621 and 622. In this way, when the connecting portions 625 are configured to have narrower widths compared to the contact portions 621 and 622, the problem of degradation in the visibility of a touch sensor due to the unnecessary recognition of the connecting portions 625 constituting the bridge pattern portions 62 can be prevented.

For example, the bridge pattern portion 62 can be configured to have an asymmetric structure with respect to the central portion of the bridge pattern portion 62. An asymmetric structure is advantageous than a symmetric structure for inducing irregular reflection, therefore the visibility of a touch sensor is enhanced by effectively inducing irregular reflection of the light when the pattern portion 62 is configured to have an asymmetric structure.

For example, the contact portions 621 and 622 constituting the bridge pattern portion 62 can be configured to be electrically connected to the second sensing electrode patterns 30 and 40 with a plurality of contact regions R11, R12, R13, and R14 as the intermediates. For a more specific example, the contact portions 621 and 622 can be configured to be electrically connected to the second sensing electrode patterns 30 and 40 with the plurality of contact regions R11, R12, R13, and R14, extended towards the both sides with respect to the lengthwise direction of the bridge pattern portion 62, as the intermediates.

When configured in this way, even the alignment between the layers of the touch sensor is not so accurate, the electrical connection between the bridge pattern portion 62 and the second sensing electrode pattern 30 and 40 is stably obtained since the bridge pattern portion 62 is contacted with at least one of the plurality of contact regions R11, R12, R13, and R14.

More specifically, the first contact portion 621 constituting the bridge pattern portion 62 is electrically connected to the left side sensing electrode pattern 30 via the two contact regions R11 and R12, and the first contact region 621 and the left side sensing electrode pattern 30 are respectively contacted with the surface areas of individual contact regions R11 and R12, thereby taking a form of three-area contact.

Also, the second contact portion 622 and the right side sensing electrode pattern 40 are respectively contacted with the surface areas of individual contact regions R13 and R14, thereby taking a form of three-area contact.

FIG. 5 illustrates that there are two contact regions R11 and R12 in the left side sensing electrode pattern 30, and also there are two contact regions R13 and R14 in the right side sensing electrode pattern 40, however, the number of contact regions, and shapes and locations thereof are not limited to these.

For example, the plurality of contact regions R11 and R12 may be the contact holes formed in the insulating portion 52, and the contact regions R11 and R12 are configured to be crossed to each other with reference to the center line along the lengthwise direction of the bridge pattern portion 62, thereby more stabilizing the electrical connection through the bridge pattern portion 62.

For an example, the bridge pattern portion 62 may be configured to have the shape of a winding curve. When the shape of the bridge pattern portion 62 is configured in this way, the irregular reflection of the light can be induced using the bridge pattern portion 62 therefore the unnecessary recognition of the bridge pattern portion 62 from the outside can be prevented, and accordingly, the visibility and the related quality of the display device mounted with a touch sensor are enhanced.

For another example, the contact portions 621 and 622 constituting the bridge pattern portion 62 and the connecting portion 625 have a plurality of different or same radiuses and at the same time have the shape of a winding curve, and the minimum widths W11 and W12 of the contact portions 621 and 622 can be formed to be wider than the maximum width W1 of the connecting portion 625. When configured in this way, the irregular reflection of the light is more effectively induced, and the width W1 of the connecting portion 625, which is highly visible from the outside, is minimized under the condition wherein the electrical characteristics of the bridge pattern portion 62 are maintained, thereby maximizing the quality of the visibility.

For example, the bridge pattern portion 62 may be formed with the same material used for the first sensing electrode pattern 20 and the second sensing electrode patterns 30 and 40, or formed with the aforementioned material added with a metallic component and the like to increase the electrical conductivity, or formed only with the metallic components of superior electrical conductivity.

Also, for example, the bridge pattern portion 62 may be formed with a material containing at least one from the group comprising silver (Ag), silver alloy, and APC having a fast etch rate.

Generally, for the case of molybdenum (Mo), the etching time is 20 to 40 seconds, and in this case, controlling of the taper is easy.

However, for the cases of silver (Ag), silver alloy, and APC, the etching time is less than 2 seconds, which is very short, so that the controlling of the shape of the taper becomes difficult, and due to this, the side surface of the bridge pattern portion will have the shape of an inverted trapezoidal, and thus, voids may occur in this region, so that there is a problem in that the sensing electrode pattern and the bridge pattern may be electrically disconnected.

The present invention can effectively manage such problems by configuring the shape of the bridge pattern portion 62 and the contact regions as previously described in detail.

Figure 6:
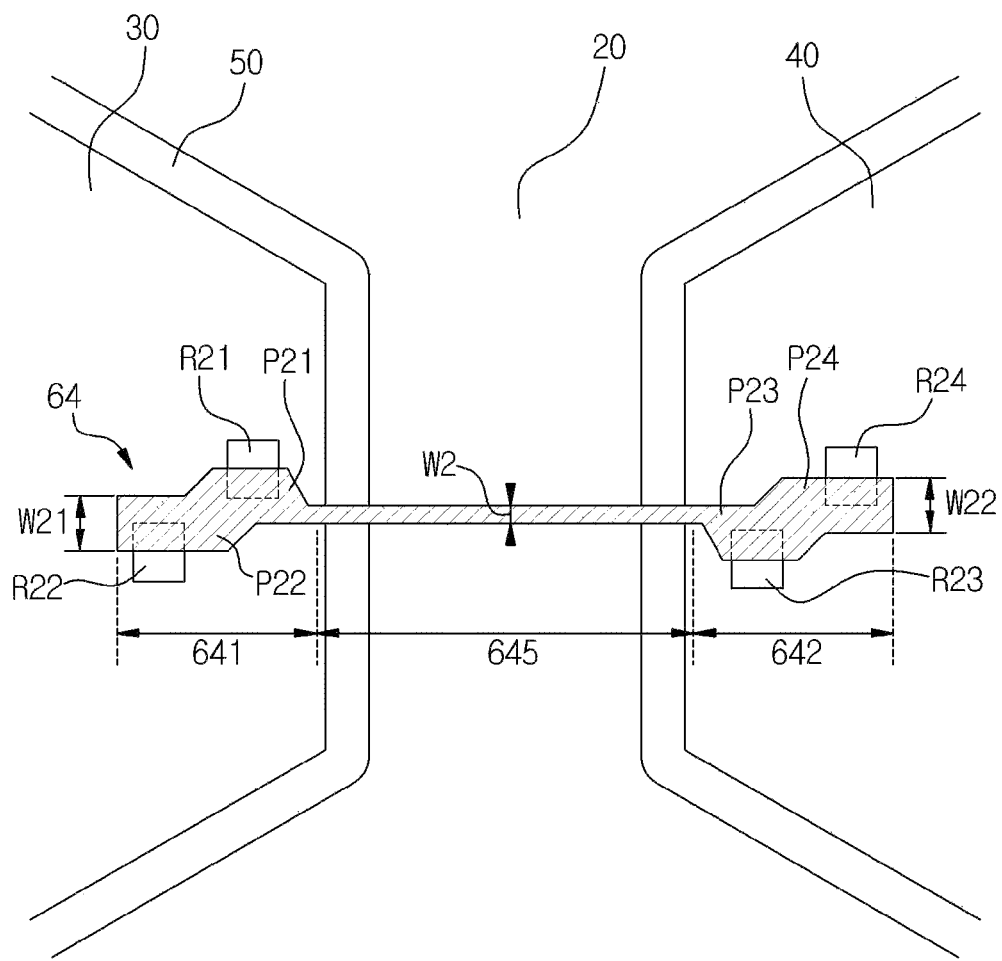
FIG. 6 is a view illustrating a touch sensor according to the second exemplary embodiment of the present invention.

FIG. 6 is a view illustrating a touch sensor according to the second exemplary embodiment of the present invention.

Referring to FIG. 6, when compared to the first exemplary embodiment previously described in detail, the second exemplary embodiment of the present invention is different in the bridge pattern portion 64, and hereinafter, the second exemplary embodiment will be described with focus on such difference.

The contact portions 641 and 642 constituting the bridge pattern portion 64 included in the second exemplary embodiment is configured to include a plurality of protruded portions P21, P22, P23, and P24 protruded towards the both sides with respect to the lengthwise direction of the bridge pattern portion 64.

More specifically, the protruded portions P21, P22, P23, and P24, included in the contact portions 641 and 642 of the bridge pattern portion 64, are configured to be electrically connected to the second sensing electrode patterns 30 and 40 through the contact regions R11, R12, R13, and R14, extending towards the both sides with respect to the lengthwise direction of the bridge pattern portion 64, as the intermediates.

When configured in this way, even the layers of the touch sensor are not so precisely aligned, the electrical connection between the bridge pattern portion 64 and the second sensing electrode pattern 30 and 40 is stably obtained since the protruded portions P21, P22, P23, and P24, included in the contact portions 641 and 642 of the bridge pattern portion 64, are contacted with at least one of the plurality of contact regions R21, R22, R23, and R24.

FIG. 6 illustrates that there are two contact regions R21 and R22 in the left side sensing electrode pattern 30, and also there are two contact regions R23 and R24 in the right side sensing electrode pattern 40, however, the number of contact regions, and shapes and locations thereof are not limited to these.

The specific example of the shape of the protruded portions P21, P22, P23, and P24 provided in the contact portions 641 and 642 will be describes as follows. Hereinafter, it will be described with reference to the first contact portion 641 contacted with the left side sensing electrode pattern 30 among the second sensing electrode patterns 30 and 40, however, same description can be applied to the second contact portion 642 contacted with the right sensing electrode pattern 40.

For example, the first contact portion 641 can be configured to comprise a first protruded portion P21 protruded towards the one side with respect to the lengthwise direction of the bridge pattern portion 64, and a second protruded portion P22 protruded towards the opposite direction of the first protruded portion P21.

For example, the first protruded portion P21 may be electrically connected to the second sensing electrode pattern 30 through the first contact region R21, extending towards the one side with respect to the lengthwise direction of the bridge pattern portion 64, as an intermediate; and the second protruded portion P22 may be electrically connected to the second sensing electrode pattern 30 through the second contact region R22, extending towards the one side with respect to the lengthwise direction of the bridge pattern portion 64, as an intermediate.

As described above in detail, according to the present invention, there is an effect in that the problem of degradation in the image quality of the display device wherein the touch sensor is mounted due to the unnecessary recognition of the bridge pattern constituting the touch sensor by a user can be prevented.

In addition, there is an advantageous effect in that the operating speed of the touch sensor can be enhanced by reducing the channel resistance and the signal delay time.

Also, there is an advantageous effect in that the problem of disconnection in the bridge pattern of the touch sensor under the high voltage environment can be prevented, and the bridge pattern and the sensing electrode pattern can be stably connected.

DESCRIPTION OF SYMBOLS

10: substrate
20: first sensing electrode pattern
30, 40: second sensing electrode pattern
50, 52, 54: insulating portion
62, 64: bridge pattern portion
621, 622, 641, 642: contact portion
625, 645: connecting portion
P21, P22, P23, P24: protruded portion
R11, R12, R13, R14, R21, R22, R23, R24: contact region

What is claimed is:

1. A touch sensor comprising:
   a plurality of first sensing electrode patterns formed in a way that they are connected to each other along a first direction on a substrate;
   a plurality of second sensing electrode patterns formed in a way that they are separated from each other along a second direction on the substrate;
   insulating portions electrically insulating the first sensing electrode patterns and the second sensing electrode patterns; and
   bridge pattern portions electrically connecting the adjacent second sensing electrode patterns, wherein
   the bridge pattern portions comprise: contact portions which are respectively contacted to the adjacent second sensing electrode patterns, and connecting portions connecting the contact portions and having a narrower width than the contact portions,
   wherein the contact portions constituting the bridge pattern portion are electrically connected to the second sensing electrode patterns via a plurality of contact areas as the intermediates, and
   wherein the plurality of contact areas penetrates the insulating portions completely from top to bottom to directly contact both of the contact portions and the second sensing electrode patterns.

2. The touch sensor according to claim 1, wherein the bridge pattern portions have an asymmetric structure.

3. The touch sensor according to claim 1, wherein the plurality of contact areas is formed in a way that the contact areas are crossed to each other with respect to the center line in the lengthwise direction of the bridge pattern portions.

4. The touch sensor according to claim 1, wherein the bridge pattern portions are formed by a material containing at least one from the group comprising silver (Ag), silver (Ag) alloy, and APC.

5. The touch sensor according to claim 1, wherein the bridge pattern portions are formed in the shape of a winding curve.

6. The touch sensor according to claim 1, wherein the contact portions and the connecting portions are formed in the shape of a winding curve while having a plurality of different radiuses of curvature or a same radius of curvature, and the minimum width of the contact portions is wider than the maximum width of the connecting portion.

7. The touch sensor according to claim 1, wherein the contact portions are electrically connected to the second sensing electrode patterns through the contact areas, as the intermediates, extending towards the both directions with respect to the lengthwise direction of the bridge pattern portions.

8. The touch sensor according to claim 1, wherein the contact portions include the protruded portions protruding towards the both directions with respect to the lengthwise direction of the bridge pattern portions.

9. The touch sensor according to claim 1, wherein the protruded portions included in the contact portions are electrically connected to the second sensing electrode patterns through the contact areas, as the intermediates, extending towards the both directions with respect to the lengthwise direction of the bridge pattern portions.

10. The touch sensor according to claim 1, wherein the contact portions include first protruded portions protruding towards one side with respect to the lengthwise direction of the bridge pattern portions, and second protruded portions protruding towards the other side with respect to the lengthwise direction of the bridge pattern portions.

11. The touch sensor according to claim 10, wherein the first protruded portions are electrically connected to the second sensing electrode patterns, as the intermediates, extending towards the one side with respect to the lengthwise direction of the bridge pattern portions, and the second protruded portions are electrically connected to the second sensing electrode patterns, as the intermediates, extending towards the other side with respect to the lengthwise direction of the bridge pattern portions.

\* \* \* \* \*